United States Patent [19]

Pollock et al.

[11] Patent Number: 5,785,332
[45] Date of Patent: Jul. 28, 1998

[54] MOTOR VEHICLE STEERING KNUCKLE ASSEMBLY

[75] Inventors: Paul R. Pollock; Dennis Timothy Mahoney; Richard Ryan, all of Fort Wayne, Ind.

[73] Assignee: Dana Corporation, Toledo, Ohio

[21] Appl. No.: 695,186

[22] Filed: Aug. 1, 1996

[51] Int. Cl.$^6$ .................................................. B60G 3/00
[52] U.S. Cl. ........................... 280/96.1; 280/691; 280/93; 301/131
[58] Field of Search ............................. 280/96.1, 691, 280/93, 103; 180/253, 254; 188/18 R, 18 A; 301/126, 131, 132

[56] References Cited

U.S. PATENT DOCUMENTS

| | | | |
|---|---|---|---|
| 3,160,479 | 12/1964 | Davenport | 29/190 |
| 3,542,392 | 11/1970 | Cumming | 280/96.1 |
| 3,584,708 | 6/1971 | Heck | 188/71.6 |
| 3,801,124 | 4/1974 | Afanador et al. | 280/96.1 X |
| 3,889,512 | 6/1975 | Delio | 72/377 |
| 3,908,480 | 9/1975 | Afanador et al. | 280/96.1 X |
| 4,054,189 | 10/1977 | Klaue | 188/71.4 |
| 4,079,799 | 3/1978 | Swan | 180/43 |
| 4,286,799 | 9/1981 | Ayres | 280/96.1 |
| 4,618,159 | 10/1986 | Kozyra et al. | 280/93 |
| 4,690,418 | 9/1987 | Smith | 280/96.1 |
| 4,693,487 | 9/1987 | Cooper | 280/96.1 |
| 4,722,540 | 2/1988 | Kozyra et al. | 280/93 |
| 4,878,683 | 11/1989 | Dever | 280/96.1 |
| 4,967,584 | 11/1990 | Sato et al. | 72/356 |
| 5,192,100 | 3/1993 | Rumpel et al. | 280/668 |
| 5,199,730 | 4/1993 | Westfall et al. | 280/96.1 |
| 5,219,176 | 6/1993 | Mitchell | 280/96.1 |
| 5,507,094 | 4/1996 | Lederman | 29/898.061 |

FOREIGN PATENT DOCUMENTS

| | | |
|---|---|---|
| 60-138045 | 7/1985 | Japan . |
| 60-138046 | 7/1985 | Japan . |
| 60-138047 | 7/1985 | Japan . |
| 60-138048 | 7/1985 | Japan . |
| 60-138049 | 7/1985 | Japan . |
| 62-77143 | 4/1987 | Japan . |
| 62-156043 | 7/1987 | Japan . |
| 75020 | 11/1918 | Switzerland . |
| 713213 | 8/1954 | United Kingdom . |

OTHER PUBLICATIONS

Portions of Chapter 2 titled "Advantages of Forgings" in printed publication Forging Industry Handbook, author(s) and/or editor(s) and publication date unknown.

Portions of a printed publication titled "Eaton Steer Axles," describing the new Integral Arm Steer Axle from Eaton, author(s) unknown and publication date believed to be Dec. 1992.

*Primary Examiner*—Christopher P. Ellis
*Attorney, Agent, or Firm*—Oldham & Oldham Co., L.P.A.

[57] ABSTRACT

An integrally joined two-piece motor vehicle steering knuckle assembly which includes a first component, preferably having a steering knuckle, a brake mounting bracket, a tie rod arm and, if needed, a steering rod arm, and a second component, preferably having a wheel spindle. The first component and the second component are integrally joined together by a process such as interference fit, welding and/or adhesive bonding, in the case of welding, most preferably friction welding, to form an integrally joined two-piece motor vehicle steering knuckle assembly.

30 Claims, 3 Drawing Sheets

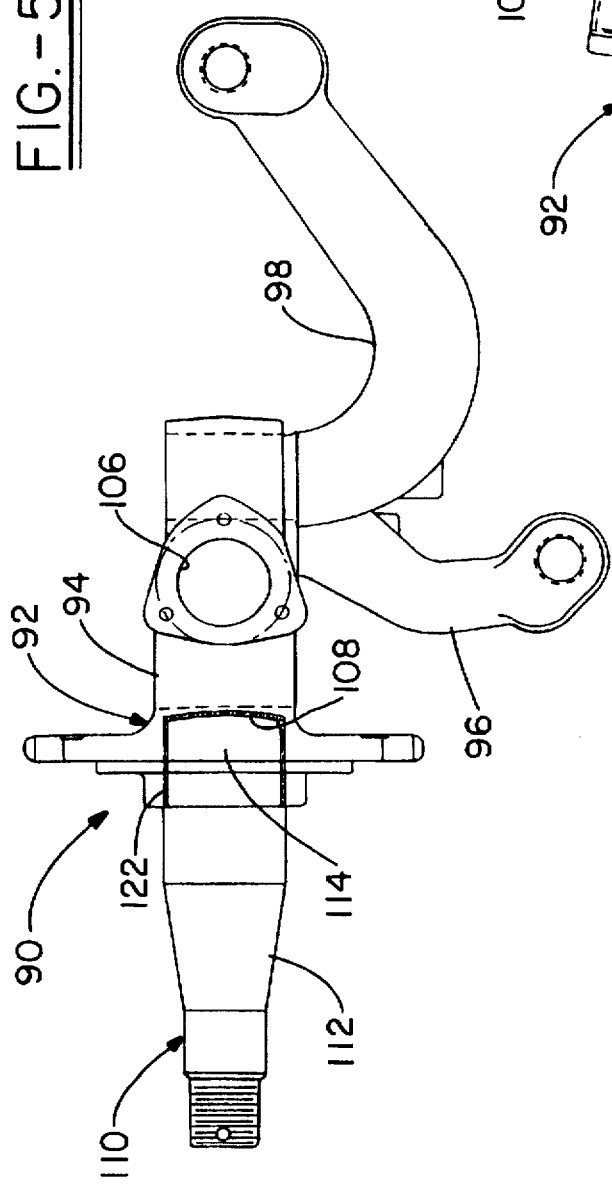

5,785,332

MOTOR VEHICLE STEERING KNUCKLE ASSEMBLY

BACKGROUND AND SUMMARY OF THE INVENTION

The present invention relates generally to new and novel improvements in steering knuckle assemblies for motor vehicles. More particularly, the present invention relates to two-piece integrally joined steering knuckle assemblies particularly suitable for heavy duty commercial motor vehicles, such as commercial trucks, which are fabricated by integrally joining two components using a joining process such as interference fit, welding and/or an adhesive bonding to create an integral two-piece motor vehicle steering knuckle assembly.

Steering knuckle assemblies of the type to which the present invention relate have been commonly used commercially on relatively heavy duty motor vehicles, such as commercial trucks and the like. Prior art steering knuckle assemblies have traditionally been fabricated by joining a spindle, an independent tie rod arm and, if needed, an independent steering rod arm, to the steering knuckle, typically by bolting or otherwise mechanically attaching these components together. While such mechanically assembled steering knuckle assemblies have performed relatively well in service, the tie rod arm and steering rod arm mechanical connections typically constitute a "weak link" in such steering knuckle assemblies. Thus, it is often necessary to compensate for this "weak link" by increasing the size and/or material strength of the separate components, thus resulting in additional cost and/or weight.

In an attempt to reduce the cost and weight of such steering knuckle assemblies, one-piece forged steel or cast iron steering knuckle assemblies have been developed which incorporate a steering knuckle, a wheel spindle, a brake mounting bracket, a tie rod arm, and, if needed, a steering rod arm, into a single integral cast or forged component. One drawback of such one-piece forged steel or cast iron steering knuckle assemblies is that the material used to fabricate the steering knuckle assembly must generally be the same for all components regardless of strength or durability required by particular components since such steering knuckle assemblies are fabricated in a single forging or casting. Furthermore, in order to modify the configuration or size of particular components in the steering knuckle assembly, it is generally necessary to make a new, or modify the existing, forging or casting mold for the entire steering knuckle assembly.

Accordingly, preferred embodiments of the present invention are, therefore, directed to a two-piece steering knuckle assembly which includes a first component, preferably having a steering knuckle, a brake mounting bracket, a tie rod arm and, if needed, a steering rod arm; and a second component, preferably having a wheel spindle. The first component and the second component are then integrally joined together by a process such as interference fit, welding and/or adhesive bonding, in the case of welding, most preferably friction welding, to form an integrally joined two-piece motor vehicle steering knuckle assembly.

Other advantages and novel features of the present invention will become apparent in the following detailed description of the invention when considered in conjunction with the accompanying drawings.

BRIEF DESCRIPTION OF THE DRAWINGS

FIG. 5 illustrates a top perspective view of an integrally joined two-piece motor vehicle steering knuckle assembly in accordance with a third preferred embodiment of the present invention where a first component, including a steering knuckle, a brake mounting bracket, a tie rod arm and a steering rod arm; and a second component, including a wheel spindle, are integrally joined together by adhesive bonding.

FIG. 6 is a side view, shown partly in cross-section and partly in plan view, of the integrally joined two-piece motor vehicle steering knuckle assembly shown in FIG. 5.

DETAILED DESCRIPTION OF THE DRAWINGS

Figures 1, 2:
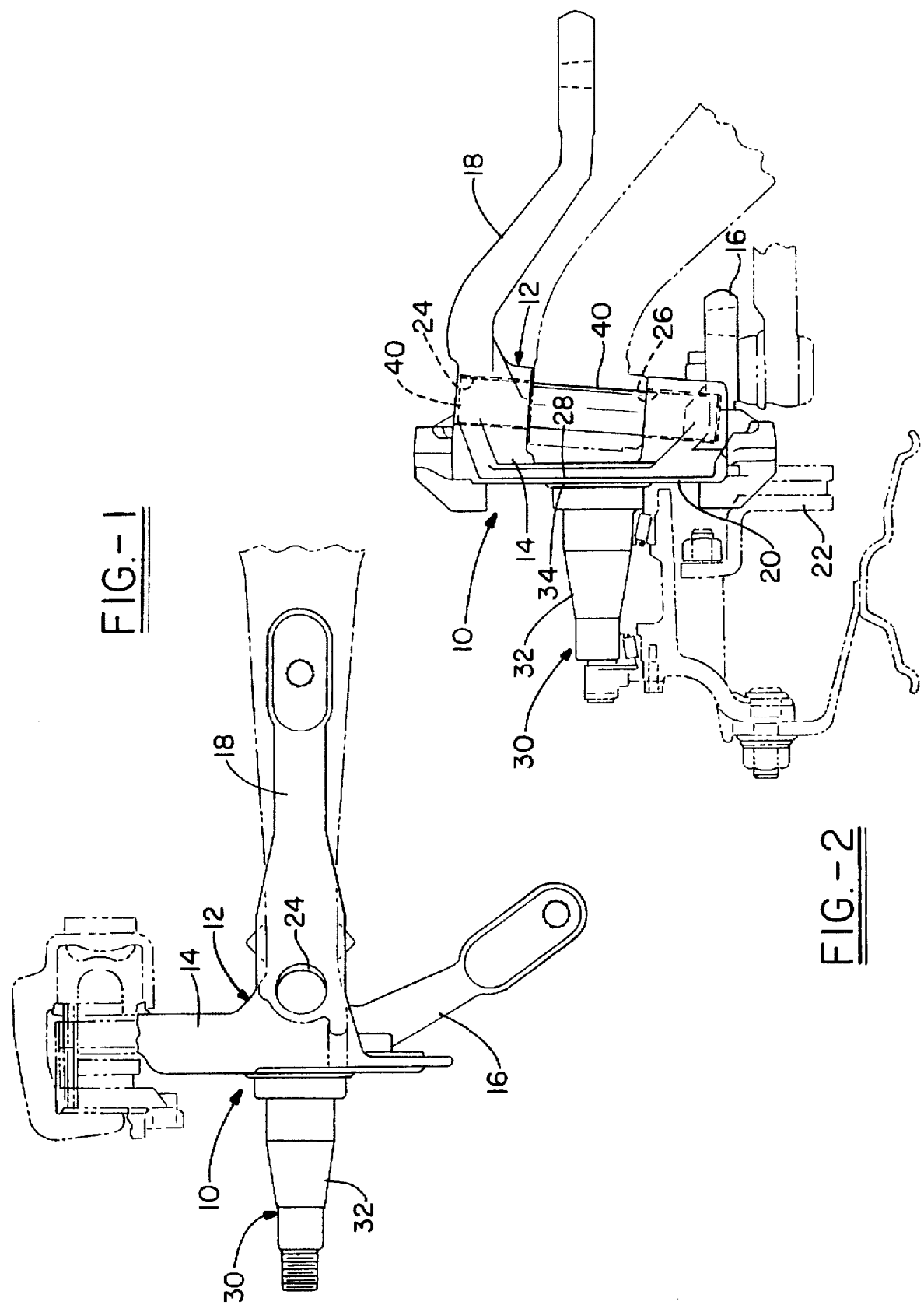
FIG. 1 illustrates a top perspective view of an integrally joined two-piece motor vehicle steering knuckle assembly in accordance with a first preferred embodiment of the present invention where a first component, including a steering knuckle, a brake mounting bracket, a tie rod arm and a steering rod arm; and a second component, including a wheel spindle, are integrally joined together by an interference fit.
FIG. 2 illustrates a side view, party in cross-section and partly in plan view, of the integrally joined two-piece motor vehicle steering knuckle assembly shown in FIG. 1.

In the following detailed description of preferred embodiments of the present invention, reference is made to the accompanying drawings which, in conjunction with this detailed description, illustrate and describe preferred embodiments of a motor vehicle steering knuckle assembly in accordance with the present invention. Referring now to the drawings, in which like-referenced characters indicate corresponding elements throughout the several views, attention is first directed to FIGS. 1 and 2, which illustrate a first preferred embodiment of an integrally joined two-piece motor vehicle steering knuckle assembly, generally identified by reference numeral 10.

As seen in FIG. 1, steering knuckle assembly 10 generally includes first component 12 and second component 30. First component 12 preferably includes flanged body portion 14 wherefrom tie rod arm 16 and, if needed, steering rod arm 18 outwardly extend. Flanged body portion 14 also includes brake spider 20 to which brake assembly 22 is attached. Flanged body portion 14, tie rod arm 16 and steering rod arm 18 are preferably formed together as a single casting, or more preferably, as a single forging. Second component 30 includes wheel spindle 32 which extends outwardly in the direction opposite from tie rod arm 16 and steering rod arm 18. Steering knuckle assembly 10 is connected to the wheel axle (not shown) by king pin 40 which extends through king pin opening 24 in tie rod arm 16 and king pin opening 26 in steering rod arm 18.

Referring now to FIG. 2, which illustrates a side view, partly in cross-section and partly in plan view, of the integrally joined two-piece motor vehicle steering knuckle assembly shown in FIG. 1, first component 12 includes bore 28, preferably a cylindrical bore, and second component 30 includes corresponding projection 34, preferably a cylindrical projection. Bore 28 and corresponding projection 34 are dimensioned such that an interference fit exists between these two elements and corresponding projection 34 is pressed into bore 28 to integrally secure first component 12 to second component 30.

Figure 3:
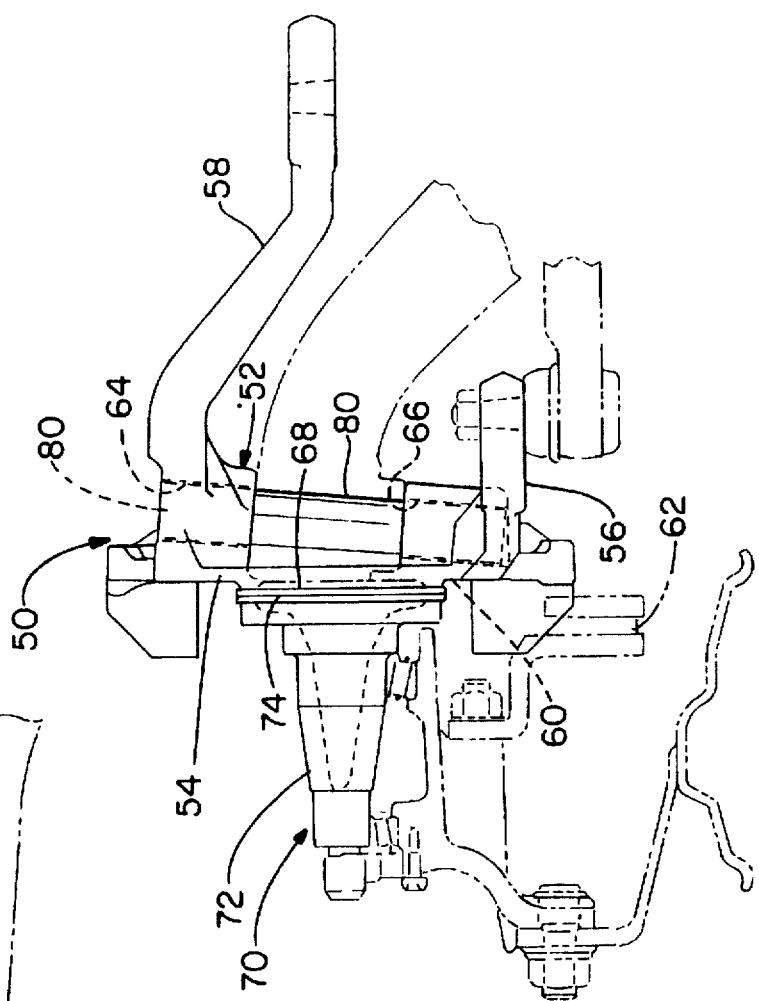
FIG. 3 illustrates a top perspective view of an integrally joined two-piece motor vehicle steering knuckle assembly in accordance with a second preferred embodiment of the present invention where a first component, including a steering knuckle, a brake mounting bracket, a tie rod arm and a steering rod arm; and a second component, including a wheel spindle, are integrally joined together by a friction weld.
Figure 4:
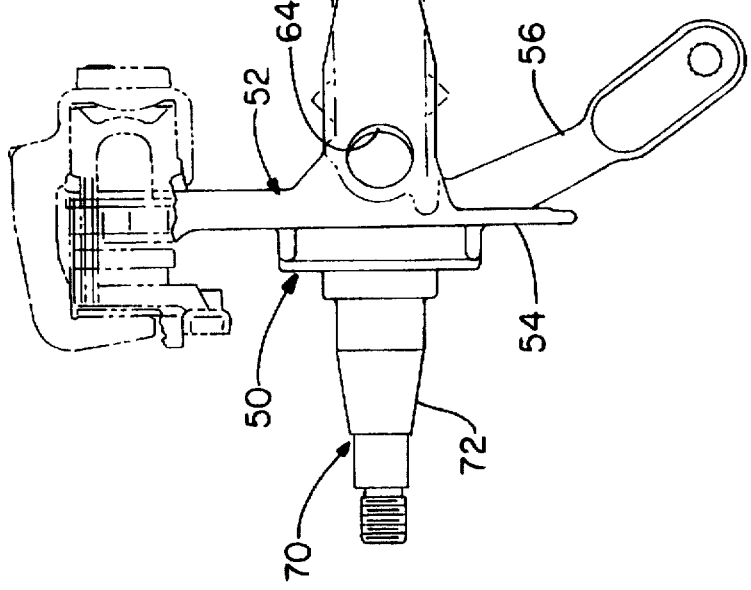
FIG. 4 is a side view, partly in cross-section and partly in plan view, of the integrally joined two-piece motor vehicle steering knuckle assembly shown in FIG. 3.

Referring now to FIGS. 3 and 4, which illustrate a second preferred embodiment of an integrally joined two-piece motor vehicle steering knuckle assembly, generally identified by reference number 50, steering knuckle assembly 50 generally includes first component 52 and second component 70. First component 52 preferably includes flanged body portion 54 wherefrom tie rod arm 56 and, if needed, steering rod arm 58 outwardly extend. Flanged body portion 54 also includes brake spider 60 to which brake assembly 62 is attached. Flanged body portion 54, tie rod arm 56 and steering rod arm 58 are preferably formed together as a single casting, or more preferably, as a single forging. Second component 70 includes wheel spindle 72 which extends outwardly in the direction opposite from tie rod arm 56 and steering rod arm 58. Steering knuckle assembly 50 is connected to the wheel axle (not shown) by king pin 80 which extends through king pin opening 64 in tie rod arm 56 and king pin opening 66 in steering rod arm 58.

Referring now to FIG. 4, which illustrates a side view, partly in cross-section and partly in plan view, of the integrally joined two-piece motor vehicle steering knuckle assembly shown in FIG. 3, first component 52 includes flat surface 68, preferably having a circular configuration, and second component 70 includes corresponding flat surface 74, preferably also having a circular configuration corresponding to that of flat surface 68. Corresponding flat surface 74 on second component 70 is rotated in relation to flat surface 68 on first component 52 under controlled friction welding parameters to join second component 70 to first component 52 by a friction weld to integrally secure second component 70 to first component 52. Excess material generated during creation of the friction weld between second component 70 and first component 52 solidifies outside flat surface 68 on first component 52 and corresponding flat surface 74 on second component 70 and can be removed in subsequent clean-up operations.

Referring now to FIGS. 5 and 6, which illustrate a third preferred embodiment of an integrally joined two-piece motor vehicle steering knuckle assembly, generally identified by reference number 90, steering knuckle assembly 90 generally includes first component 92 and second component 110. First component 92 preferably includes flanged body portion 94 wherefrom tie rod arm 96 and, if needed, steering rod arm 98 outwardly extend. Flanged body portion 94 also includes brake spider 100 to which brake assembly (not shown) is attached. Flanged body portion 92, tie rod arm 96 and steering rod arm 98 are preferably formed together as a single casting, or more preferably, as single forging. Second component 110 includes wheel spindle 112 which extends outwardly in the direction opposite from tie rod arm 96 and steering rod arm 98. Steering knuckle assembly 90 is connected to the wheel axle (not shown) by king pin 120 which extends through king pin opening 104 in tie rod arm 96 and king pin opening 106 in steering rod arm 98.

Referring now to FIG. 6, which illustrates a side view, partly in cross-section and partly in plan view, of the integrally joined two-piece motor vehicle steering knuckle assembly shown in FIG. 5, first component 92 includes bore 108, preferably a cylindrical bore, and second component 110 includes corresponding projection 114, preferably a cylindrical projection. Bore 108 and corresponding projection 114 are preferably dimensioned such that clearance exists between the inside diameter of bore 108 and the outside diameter of corresponding projection 114. A predetermined amount of an adhesive bonding material, such as "Loctite" available from Loctite Corporation in Warrensville Heights, Ohio, identified generally by reference number 122, is applied to the inside diameter of bore 108 and/or the outside diameter of corresponding projection 114. Corresponding projection 114 of second component 110 is then inserted into bore 108 of first component 92 so adhesive bonding material 122 is positioned in the clearance which exists between the inside diameter of bore 108 and the outside diameter of corresponding projection 114. Adhesive bonding material 122 is then allowed to solidify to integrally secure first component 92 to second component 110.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. An integrally joined two-piece motor vehicle steering knuckle assembly, comprising:

a first component including a flanged body portion having a first surface and a second surface, said first component also including a brake spider and a tie rod arm extending outwardly from said first surface of said flanged body portion;

a second component having a first surface and a second surface, said second component including a wheel spindle extending outwardly from said first surface of said second component; and said second surface of said flanged body portion of said first component and said second surface of said second component are integrally joined together by an interference fit.

2. The integrally joined two-piece motor vehicle steering knuckle assembly in accordance with claim 1, wherein said second surface of said flanged body portion of said first component includes a bore and said second surface of said second component includes a corresponding projection and said corresponding projection is pressed into said bore to form an interference fit between said first component and said second component.

3. The integrally joined two-piece motor vehicle steering knuckle assembly in accordance with claim 1, wherein said second surface of said flanged body portion of said first component includes a cylindrical bore and said second surface of said second component includes a corresponding cylindrical projection and said corresponding cylindrical projection is pressed into said cylindrical bore to form an interference fit between said first component and said second component.

4. The integrally joined two-piece motor vehicle steering knuckle assembly in accordance with claim 1, wherein said first component is fabricated from a single forging.

5. The integrally joined two-piece motor vehicle steering knuckle assembly in accordance with claim 4, wherein said second component is fabricated from a single forging.

6. The integrally joined two-piece motor vehicle steering knuckle assembly in accordance with claim 1, wherein said first component includes a steering rod arm extending outwardly from said first surface of said flanged body portion.

7. The integrally joined two-piece motor vehicle steering knuckle assembly in accordance with claim 6, wherein said second surface of said flanged body portion of said first component includes a bore and said second surface of said second component includes a corresponding projection and said corresponding projection is pressed into said bore to form an interference fit between said first component and said second component.

8. The integrally joined two-piece motor vehicle steering knuckle assembly in accordance with claim 6, wherein said second surface of said flanged body portion of said first component includes a cylindrical bore and said second surface of said second component includes a corresponding cylindrical projection and said corresponding cylindrical projection is pressed into said cylindrical bore to form an interference fit between said first component and said second component.

9. The integrally joined two-piece motor vehicle steering knuckle assembly in accordance with claim 1, wherein said first component is fabricated from a first forging and said second component is fabricated from a second forging.

10. A method of fabricating an integral two-piece motor vehicle steering knuckle assembly, comprising the steps of:
providing a first component having a flanged body portion with a first surface and a second surface, said first component also including a brake spider and a tie rod arm extending outwardly from said first surface of said flanged body portion;
providing a second component having a first surface and a second surface, said second component including a wheel spindle extending outwardly from said first surface of said second component; and
integrally joining said second surface of said flanged body portion of said first component and said second surface of said second component by an interference fit.

11. An integrally joined two-piece motor vehicle steering knuckle assembly, comprising:
a first component having a flanged body portion with a first surface and a second surface, said first component also including a brake spider and a tie rod arm extending outwardly from said first surface of said flanged body portion;
a second component having a first surface and a second surface, said second component including a wheel spindle extending outwardly from said first surface of said second component; and
said second surface of said flanged body portion of said first component and said second surface of said second component are integrally joined together by a friction weld.

12. The integrally joined two-piece motor vehicle steering knuckle assembly in accordance with claim 11, wherein said second surface of said flanged body portion of said first component includes a flat surface and said second surface of said second component includes a corresponding flat surface and said corresponding flat surface of said second component is rotated in relation to said flat surface of said first component to form a friction weld between said first component and said second component.

13. The integrally joined two-piece motor vehicle steering knuckle assembly in accordance with claim 11, wherein said second surface of said flanged body portion of said first component includes a circular flat surface and said second surface of said second component includes a corresponding circular flat surface and said corresponding circular flat surface of said second component is rotated in relation to said circular flat surface of said first component to form a friction weld between said first component and said second component.

14. The integrally joined two-piece motor vehicle steering knuckle assembly in accordance with claim 11, wherein said first component is fabricated from a single forging.

15. The integrally joined two-piece motor vehicle steering knuckle assembly in accordance with claim 14, wherein said second component is fabricated from a single forging.

16. The integrally joined two-piece motor vehicle steering knuckle assembly in accordance with claim 11, wherein said first component includes a steering rod arm extending outwardly from said first surface of said flanged body portion.

17. The integrally joined two-piece motor vehicle steering knuckle assembly in accordance with claim 16, wherein said second surface of said flanged body portion of said first component includes a flat surface and said second surface of said second component includes a corresponding flat surface and said corresponding flat surface of said second component is rotated in relation to said flat surface of said first component to form a friction weld between said first component and said second component.

18. The integrally joined two-piece motor vehicle steering knuckle assembly in accordance with claim 16, wherein said second surface of said flanged body portion of said first component includes a circular flat surface and said second surface of said second component includes a corresponding circular flat surface and said corresponding circular flat surface of said second component is rotated in relation to said cylindrical flat surface of said first component to form a friction weld between said first component and said second component.

19. The integrally joined two-piece motor vehicle steering knuckle assembly in accordance with claim 16, wherein said first component is fabricated from a first forging and said second component is fabricated from a second forging.

20. A method of fabricating an integral two-piece motor vehicle steering knuckle assembly, comprising the steps of:
providing a first component having a flanged body portion with a first surface and a second surface, said first component also including a brake spider and a tie rod arm extending outwardly from said first surface of said flanged body portion;
providing a second component having a first surface and a second surface, said second component including a wheel spindle extending outwardly from said first surface of said second component; and
integrally joining said second surface of said flanged body portion of said first component and said second surface of said second component by a friction weld.

21. An integrally joined two-piece motor vehicle steering knuckle assembly, comprising:
a first component having a flanged body portion with a first surface and a second surface, said first component also including a brake spider and a tie rod arm extending outwardly from said first surface of said flanged body portion;
a second component having a first surface and a second surface, said second component including a wheel spindle extending outwardly from said first surface of said second component; and
said second surface of said flanged body portion of said first component and said second surface of said second component are integrally joined together by an adhesive bond.

22. The integrally joined two-piece motor vehicle steering knuckle assembly in accordance with claim 21, wherein said second surface of said flanged body portion of said first component includes a bore and said second surface of said second component includes a corresponding projection and said corresponding projection on said second component is inserted into said bore in said first component to form an adhesive bond between said first component and said second component.

23. The integrally joined two-piece motor vehicle steering knuckle assembly in accordance with claim 21, wherein said second surface of said flanged body portion of said first component includes a cylindrical bore and said second surface of said second component includes a corresponding cylindrical projection and said corresponding cylindrical projection of said second component is inserted into said cylindrical bore in said first component to form an adhesive bond between said first component and said second component.

24. The integrally joined two-piece motor vehicle steering knuckle assembly in accordance with claim 21, wherein said first component is fabricated from a single forging.

25. The integrally joined two-piece motor vehicle steering knuckle assembly in accordance with claim 24, wherein said second component is fabricated from a single forging.

26. The integrally joined two-piece motor vehicle steering knuckle assembly in accordance with claim 21, wherein said first component includes a steering rod arm extending outwardly from said first surface of said flanged body portion.

27. The integrally joined two-piece motor vehicle steering knuckle assembly in accordance with claim 26, wherein said second surface of said flanged body portion of said first component includes a bore and said second surface of said second component includes a corresponding projection and said corresponding projection on said second component is inserted into said bore in said first component to form an adhesive bond between said first component and said second component.

28. The integrally joined two-piece motor vehicle steering knuckle assembly in accordance with claim 26, wherein said second surface of said flanged body portion of said first component includes a cylindrical bore and said second surface of said second component includes a corresponding cylindrical projection and said corresponding cylindrical projection on said second component is inserted into said cylindrical bore in said first component to form an adhesive bond between said first component and said second component.

29. The integrally joined two-piece motor vehicle steering knuckle assembly in accordance with claim 26, wherein said first component is fabricated from a first forging and said second component is fabricated from a second forging.

30. A method of fabricating an integral two-piece motor vehicle steering knuckle assembly, comprising the steps of:

providing a first component having a flanged body portion with a first surface and a second surface, said first component also including a brake spider and a tie rod arm extending outwardly from said first surface of said flanged body portion;

providing a second component having a first surface and a second surface, said second component including a wheel spindle extending outwardly from said first surface of said second component; and integrally joining said second surface of said flanged body portion of said first component and said second surface of said second component by an adhesive bond.

* * * * *